(12) United States Patent
Hwang (10) Patent No.: US 12,254,713 B2
(45) Date of Patent: Mar. 18, 2025

(54) IN-STORE FOOD AND BEVERAGE TRANSFER AND COLLECTION SYSTEM USING IMAGE RECOGNITION AND METHOD OF TRANSFERRING AND COLLECTING FOOD AND BEVERAGE IN STORE USING THE SAME

(71) Applicant: XYZ, Inc., Seoul (KR)

(72) Inventor: Sung Jae Hwang, Seongnam-si (KR)

(73) Assignee: XYZ, Inc., Seoul (KR)

(*) Notice: Subject to any disclaimer, the term of this patent is extended or adjusted under 35 U.S.C. 154(b) by 404 days.

(21) Appl. No.: 17/370,112

(22) Filed: Jul. 8, 2021

(65) Prior Publication Data

US 2021/0342573 A1   Nov. 4, 2021

Related U.S. Application Data

(63) Continuation of application No. PCT/KR2020/011022, filed on Aug. 19, 2020.

(30) Foreign Application Priority Data

Sep. 18, 2019   (KR) .................. 10-2019-0114672

(51) Int. Cl.
*G06V 40/16* (2022.01)
*G05D 1/00* (2024.01)
(Continued)

(52) U.S. Cl.
CPC ......... *G06V 40/168* (2022.01); *G05D 1/0088* (2013.01); *G05D 1/0094* (2013.01);
(Continued)

(58) Field of Classification Search
CPC ....... G05D 1/0094; G05D 1/0088; B25J 9/16; B25J 9/1602; B25J 9/1679; B25J 9/1664;
(Continued)

(56) References Cited

U.S. PATENT DOCUMENTS

| 2002/0002493 | A1* | 1/2002 | Tanaka | ............... | G06Q 30/0225 |
| | | | | | 705/15 |
| 2011/0050442 | A1* | 3/2011 | Hefferon | ................ | G08B 5/221 |
| | | | | | 340/679 |

(Continued)

FOREIGN PATENT DOCUMENTS

| CN | 109492723 A | * | 3/2019 |
| CN | 109963114 A | | 7/2019 |

(Continued)

OTHER PUBLICATIONS

L. Zhang, S. Rockel and J. Zhang, "Exception handling for experience-based mobile cognitive systems in restaurant environments exemplified by guest detection," 2013 IEEE International Conference on Information and Automation (ICIA), Yinchuan, China, 2013, pp. 970-975, doi: 10.1109/ICInfA.2013.6720435. (Year: 2013).*

(Continued)

*Primary Examiner* — Ming Y Hon
*Assistant Examiner* — Julia Z. Yao
(74) *Attorney, Agent, or Firm* — Dinsmore & Shohl LLP; Yongsok Choi, Esq.

(57) ABSTRACT

Provided are an in-store food and beverage transfer and collection system using image analysis and a method of transferring and collecting food and beverage in a store using the same in-store food and beverage transferred and collection system. The in-store food and beverage transfer and collection system using image analysis includes: an image obtaining unit configured to obtain an image of a predetermined area and comprising a plurality of cameras; a processing unit configured to process a control command for processing an order of a customer by using an image obtained by the image obtaining unit; and a transfer robot configured to obtain order information of the customer (Continued)

according to the control command of the processing unit, and transfer food and beverage that are ordered.

16 Claims, 8 Drawing Sheets

(51) Int. Cl.
*G06V 10/74* (2022.01)
*G06V 20/68* (2022.01)
*G06V 40/20* (2022.01)

(52) U.S. Cl.
CPC .............. *G06V 10/74* (2022.01); *G06V 20/68* (2022.01); *G06V 40/172* (2022.01); *G06V 40/20* (2022.01)

(58) Field of Classification Search
CPC .... B25J 11/0045; B25J 11/008; B25J 9/1697; B25J 11/0005; G06V 40/172; G06V 40/168; G06V 10/74; G06V 20/68; G06V 20/00; G06Q 50/12; G06Q 30/0635
See application file for complete search history.

(56) References Cited

U.S. PATENT DOCUMENTS

| | | | | |
|---|---|---|---|---|
| 2013/0097038 | A1* | 4/2013 | Potter | G06Q 50/12 705/21 |
| 2015/0206259 | A1* | 7/2015 | Takahashi | G06V 20/52 705/15 |
| 2016/0055598 | A1* | 2/2016 | Ramini | G06Q 50/12 705/15 |
| 2019/0270204 | A1* | 9/2019 | Kawamura | B25J 9/1697 |
| 2019/0325569 | A1* | 10/2019 | Thomas | G06T 7/70 |
| 2020/0159188 | A1* | 5/2020 | He | A47J 44/00 |
| 2020/0290210 | A1* | 9/2020 | Ha | B25J 11/0045 |
| 2021/0354305 | A1* | 11/2021 | Kim | B25J 13/003 |

FOREIGN PATENT DOCUMENTS

| | | | |
|---|---|---|---|
| CN | 109993157 | A | 7/2019 |
| CN | 110210999 | A * | 9/2019 |
| JP | 2003235711 | A * | 8/2003 |
| JP | 2004133904 | A | 4/2004 |
| JP | 2005202522 | A * | 7/2005 |
| JP | 2018181222 | A * | 11/2018 |
| JP | 2019003360 | A * | 1/2019 |
| JP | 2019117631 | A * | 7/2019 |
| KR | 1062554 | B1 * | 9/2011 |
| KR | 101062554 | B1 | 9/2011 |
| KR | 101083700 | B1 | 11/2011 |
| KR | 101204418 | B1 | 11/2012 |
| KR | 101628115 | B1 | 6/2016 |
| KR | 101759091 | B1 | 7/2017 |
| KR | 1020190092337 | A | 8/2019 |
| WO | WO-2017006291 | A1 * | 1/2017 |

OTHER PUBLICATIONS

International Search Report of PCT/KR2020/011022 dated Feb. 10, 2021.

* cited by examiner

IN-STORE FOOD AND BEVERAGE TRANSFER AND COLLECTION SYSTEM USING IMAGE RECOGNITION AND METHOD OF TRANSFERRING AND COLLECTING FOOD AND BEVERAGE IN STORE USING THE SAME

CROSS-REFERENCE TO RELATED APPLICATIONS

This application is a continuation of International Application No. PCT/KR2020/011022 filed on Aug. 19, 2020, which claims priority to Korean Patent Application No. 10-2019-0114672 filed on Sep. 18, 2019, the entire contents of which are herein incorporated by reference.

BACKGROUND

1. Field

The present disclosure relates to an in-store food and beverage transfer and collection system using image recognition and a method of transferring and collecting food and beverage using the in-store food and beverage transfer and collection system, and more particularly, to an in-store food and beverage transfer and collection system using image recognition, which recognizes customers by using a plurality of cameras, detects a table occupied by each customer, and takes an order and serves the table with food and beverage by using a transfer robot, and to a method of transferring and collecting food and beverage using the in-store food and beverage transfer and collection system.

2. Description of the Related Art

With the development of robot technology, technology in which an unmanned robot makes and transfers food or beverage has been developed. For example, in a case of making coffee, a robot that automatically performs roasting, blending, grinding, and espresso extraction from raw green beans and puts the prepared coffee in a cup and moves the coffee to a desired position has been developed. By using such a robot, an unmanned serving service technology in which a robot transfers ordered food and collects tableware of finished food in a store such as a restaurant and a café is emerging.

Korean Patent No. 10-1204418 published in the related art discloses a system for delivering, to the table, food ordered by a consumer using an electronic menu board installed on a table at various restaurants selling food or alcohol, by using the robot moving along a robot movement path, and Korean Patent No. 10-1759091 discloses a system for transferring food and beverage arranged on a food display stand to a pick-up display stand by using a transfer robot.

However, in Korean Patent No. 10-1204418, there is a problem that customer information is excluded in a process of receiving an order and transferring the food because the robot transfers the food by identifying order information by table. To combine customer information with order information, a customer inconveniently has to log in to the electronic order board of the table or the store has to manually combine information one by one. In addition, a person must collect dishes after the customer finishes the meal, and thus, an unmanned serving service is not completely implemented.

Although Korean Patent No. 10-1759091 discloses a preferred embodiment of an unmanned store, there is a problem in that a customer has to directly go to the pick-up display stand to get food, which is a self-serving service. Thus, an unmanned serving service is not completely implemented, either.

SUMMARY

The present disclosure provides a store system for responding to a customer by obtaining an image of a complete view within the store and automatically determining a situation in the store.

In addition, the present disclosure provides a store system, in which an inconvenience of the customer having to order at an order stand and pick up food and beverage is removed to improve the convenience of the customer.

In addition, the present disclosure is to automatically provide a free refill and take an additional order of food and beverage by automatically recognizing the finished meal of a customer.

In addition, the present disclosure is to automatically collect dishes of a customer when the customer finishes a meal.

According to an embodiment of the present disclosure, an in-store food and beverage transfer and collection system using image analysis includes an image obtaining unit configured to obtain an image of a predetermined area, the image obtaining unit comprising a plurality of cameras, a processing unit configured to process a control command for processing an order of a customer by using the image obtained by the image obtaining unit, and a transfer robot configured to obtain order information of the customer according to the control command of the processing unit, and transfer food and beverage that are ordered.

The processing unit may include a customer recognition unit configured to analyze a face image of the customer obtained by the image obtaining unit and identify the customer, and an object tracking unit configured to track the customer identified by the customer recognition unit by using the image obtained by the image obtaining unit.

The processing unit may further include an order information matching unit configured to match the face image of the customer with the order information of the customer.

The processing unit may further include an object tracking unit configured to obtain information on a table occupied by the customer by using the image obtained by the image obtaining unit.

The object tracking unit may be further configured to determine that the table is occupied by the customer when a time for which the customer stays in the table is greater than or equal to a predetermined reference time.

The processing unit may further include a transfer robot control unit configured to generate a control command to allow the transfer robot to obtain the order information of the customer in a table determined to be occupied by the customer.

The processing unit may further include a transfer robot control unit configured to generate a control command to allow the transfer robot to transfer the food or beverage ordered by the customer to a table determined to be occupied by the customer.

The processing unit may further include a food/beverage consumption finish determination unit configured to determine a food/beverage consumption finish of the customer based on an image of food or beverage obtained by the image obtaining unit, and a transfer robot control unit configured to generate a control command to allow the transfer robot to collect tableware from a table that the food/beverage consumption finish determination unit determines that a consumption is finished.

The food/beverage consumption finish determination unit may be further configured to determine a food/beverage consumption finish of the customer based on at least one of a meal time, an amount of leftover food, a frequency of consuming activity, an arrangement of tableware, and a collection request of the customer.

The food/beverage consumption finish determination unit may be further configured to determine whether a tableware is arranged in a predetermined area of the table in which the consumption is determined to be finished, and the transfer robot control unit is further configured to generate a control command to allow the transfer robot to collect the tableware arranged in the predetermined area.

The transfer robot control unit may be further configured to generate a control command to allow the transfer robot to move to the table in which the consumption is determined to be finished, and receive an additional order.

The processing unit may further include a food/beverage consumption finish determination unit configured to determine whether a finished subject of consumption is available for a free refill, and a transfer robot control unit configured to, when the food/beverage consumption finish determination unit determines that the finished subject of consumption is available for the free refill, generate a control command to allow the transfer robot to transfer to refill the finished subject of consumption.

The processing unit may further include a food/beverage consumption finish determination unit configured to determine whether a finished subject of consumption requires a pay order, and a transfer robot control unit configured to, when the food/beverage consumption finish determination unit determines that the finished subject of consumption requires the pay order, generate a control command to allow the transfer robot to move to a table in which the consumption is determined to be finished, to receive an additional order.

According to an embodiment of the present disclosure, a method of transferring and collecting food and beverage in a store using image analysis includes an image obtaining operation of obtaining an image of a predetermined area by using an image obtaining unit, the image obtaining unit comprising a plurality of cameras, a processing operation of processing, by a processing unit, a control command for processing an order of a customer by using the image obtained by the image obtaining unit, and a transfer operation of obtaining order information of the customer according to the control command of the processing unit and transferring food and beverage that are ordered, by using a transfer robot.

The processing operation may include a customer recognition operation of analyzing a face image of the customer obtained by the image obtaining unit and identifying the customer, by using a customer recognition unit, and an object tracking operation of tracking, by an object tracking unit, the customer identified by the customer recognition unit by using the image obtained by the image obtaining unit.

The processing operation may further include an order information matching operation of matching the face image of the customer with the order information of the customer by using an order information matching unit.

The processing operation may include an object tracking operation of obtaining, by an object tracking unit, information on a table occupied by the customer by using the image obtained by the image obtaining unit.

The object tracking operation may include, when a time for which the customer stays in the table is greater than or equal to a predetermined reference time, determining that the table is occupied by the table by using the object tracking unit.

The processing operation may further include a transfer robot control operation of generating, by the processing unit, a control command to allow the transfer robot to obtain the order information of the customer in a table determined to be occupied by the customer.

The processing operation may further include a transfer robot control operation of generating, by the processing unit, a control command to allow the transfer robot to transfer a food or beverage ordered by the customer to a table determined to be occupied by the customer.

The processing operation may further include a food/beverage consumption finish determination operation of determining, by a food/beverage consumption finish determination unit, whether the customer has finished consumption based on an image of food and beverage obtained by the image obtaining unit, and a transfer robot control operation of generating, by the transfer robot control unit, a control command to allow the transfer robot to collect tableware of a table in which a consumption is determined to be finished in the food/beverage consumption finish determination unit.

The food/beverage consumption finish operation unit may include determining, by the food/beverage consumption finish determination unit, whether the customer has finished consumption based on at least one of a meal time, an amount of a remaining content, a frequency of eating activity, an arrangement of tableware, and a collection request of the customer.

The food/beverage consumption finish determination operation may include determining, by the food/beverage consumption finish determination unit, an arrangement of a tableware in a predetermined area of the table in which the consumption is determined to be finished, and the transfer robot control operation may include generating, by the transfer robot control unit, to allow the transfer robot to collect the tableware arranged in the predetermined area.

The transfer robot control operation may include generating, by the transfer robot control unit, to allow the transfer robot to move to the table in which the consumption is determined to be finished, to receive an additional order.

The processing operation may further include a food/beverage consumption finish determination operation of determining whether a subject of consumption to be finished is available for a free refill, by using a food/beverage consumption finish determination unit, and a transfer robot control operation of, when it is determined in the food/beverage consumption finish determination operation that the subject of consumption to be finished is available for a free refill, generating, by a transfer robot control unit, a control command to allow the transfer robot to transfer to refill a finished subject of consumption.

The processing operation may further include a food/beverage consumption finish determination operation of determining whether a subject of consumption to be finished requires a pay order, by using a food/beverage consumption finish determination unit, and a transfer robot control operation of, when the subject of consumption to be finished requires the pay order in the food/beverage consumption finish determination operation, generating, by a transfer robot control unit, a control command to allow the transfer robot to move to a table in which the consumption is determined to be finished, to receive an additional order.

BRIEF DESCRIPTION OF THE DRAWINGS

These or other aspects will become apparent and more readily appreciated from the following description of the embodiments, taken in conjunction with the accompanying drawings in which.

DETAILED DESCRIPTION

One or more embodiments of the present disclosure will be described below in more detail with reference to the accompanying drawings so that those of skill in the art may easily work the embodiments of the present disclosure. However, the present disclosure may have various different forms and configuration and is not limited to the embodiments described herein. In addition, in order to clearly explain the embodiments of the present disclosure in the drawings, parts that are not related to description is omitted.

The terms used herein are used to illustrate specific embodiments only, and are not intended to limit the present disclosure. An expression used in the singular encompasses an expression of the plural unless the context expressly indicates otherwise.

In the present disclosure, terms such as "comprise", "have", or "include" are intended to indicate that features, numbers, operations, components, parts, or combinations thereof described in the present disclosure are present, and it can be understood that the present or additional possibility of one or more other features, numbers, operations, components, parts, or combinations thereof is not excluded in advance.

In addition, elements shown in embodiments of the present disclosure are independently shown to represent different characteristic functions, and it does not mean that each of the elements is configured by separate hardware or one software unit. That is, for convenience of description, each component is described by listing each component, and at least two components among the respective components may be combined to form one component, or one component may be divided into a plurality of components to perform a function. An integrated embodiment and a separated embodiment of each component are included in the scope of the present disclosure without departing from the spirit and scope of the present disclosure.

In addition, the following embodiments are provided to more clearly describe an ordinary knowledge in the art, and shapes and sizes of elements in the drawings may be exaggerated for more clear description.

Hereinafter, embodiments of the present disclosure will be described with reference to the accompanying drawings.

Figure 1:
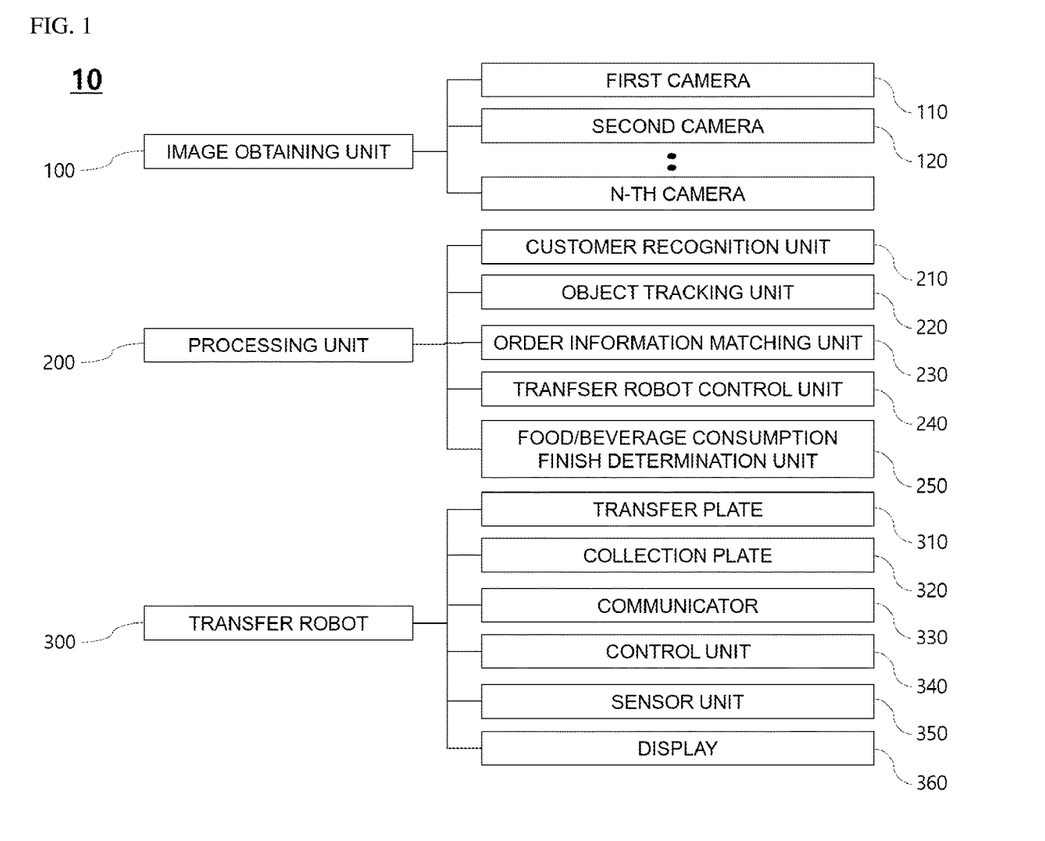
FIG. 1 is a schematic block diagram of an in-store food and beverage transfer and collection system according to an embodiment of the present disclosure.

FIG. 1 is a schematic block diagram of an in-store food and beverage transfer and collection system 10 according to an embodiment of the present disclosure.

Referring to FIG. 1, the in-store food and beverage transfer and collection system 10 using image recognition may include an image obtaining unit 100, a processing unit 200, and a transfer robot 300. The image obtaining unit 100 may include a plurality of cameras including a first camera 110, a second camera 120, . . . , and an n-th camera, and may be configured to obtain an image of a predetermined area. Here, the predetermined area may include an area within a store, and an area outside the store may also be included in the predetermined area as long as an image thereof is obtained by the image obtaining unit 100. In other words, the predetermined area may include an area of which an image is obtained by the image obtaining unit 100.

The processing unit 200 may be configured to process a control command for processing an order of a customer by using an image obtained by the image obtaining unit 100. In an embodiment of the present disclosure, the processing unit 200 may include at least one of a customer recognition unit 210, an object tracking unit 220, an order information matching unit 230, a transfer robot control unit 240, and a food/beverage consumption finish determination unit 250. Also, the processing unit 200 may be implemented as a central processing unit (CPU), an application processor (AP), or the like, and may include a memory therein for storing instructions or data related to at least one other element, or may generate, process, or execute a control command by communicating with an external memory to access necessary information if necessary.

The customer recognition unit 210 may be configured to analyze a face image of a customer obtained by the image obtaining unit 100 and identify the customer. The customer recognition unit 210 may be configured to analyze the image obtained by the image obtaining unit 100, and trace and objectify a face part of the image of the customer when the image of the customer appears. Thereafter, the customer recognition unit 210 may determine whether the objectified face represents an existing customer, and if yes, may recognize the corresponding customer, and if no, generate new customer information and treat the objectified face as one piece of customer identification information. Because a customer is identified by the face thereof shown in the image, it is not necessary to manually retrieve and manage the customer's account.

In addition, the customer recognition unit 210 may objectify the corresponding customer by using not only a face image of the customer but also a feature point of the customer such as a face image of the customer, a shape of clothes of the customer, a color of clothes of the customer, a hair style of the customer, or a skin color of the customer.

The object tracking unit 220 may be configured to track the customer identified by the customer recognition unit 210 by using the image obtained by the image obtaining unit 100. The object tracking unit 220 may track the objectified face of the customer in the corresponding image by analyzing the image obtained by the image obtaining unit 100. Here, the image may include all images obtained by the first camera 110, the second camera 120, . . . , the n-th camera. In addition, the image may include a still image and a continuous image, that is, moving image. Three-dimensional (3D) spatial information of a structure of the store may be constructed by using an RGB-depth (RGB-D) camera based simultaneous localization and mapping (SLAM), a 3D light detection and ranging (LiDAR) based SLAM, a radar based SLAM, or inertial sensor/camera/LiDAR/radar integrated 3D SLAM, and by using the 3D spatial information, the object tracking unit 220 may identify a location of the customer being tracked in real time. For example, the 3D spatial information of the store may include spatial information of a table in the store, and by using this, it may be determined whether the customer moves toward the table or moves away from the table. The determination may be performed by the object tracking unit 220 using the real-time location information of the customer and the spatial information of the table derived by obtaining the image of the customer and analyzing the image and the 3D spatial information of the store in combination. The real-time location of the customer is tracked by identifying the face image of the customer, and thus, a movement route of the corresponding customer may be identified. In addition, the object tracking unit 220 may track the corresponding customer by using a feature point of the customer, that is, a shape of clothes of the customer, a color of clothes of the customer, a hair style of the customer, or a skin color of the customer described above.

In addition, the object tracking unit 220 may determine whether a table is occupied by the customer. When the real-time location of the customer is continuously observed for a predetermined time or more in a predetermined space around the table, for example, the table and a space having a radius of about 1 m around the table, it may be determined or regarded that the corresponding table is occupied by the customer. The table occupied by the customer is automatically identified through an image, and thus, an ordering device on the table frequently occurring in an unmanned store in the related art may be removed. Moreover, from the customer's point of view, because the store side recognizes the occupied table by identifying the movement route of the customer, there may be no need to let the store side know the table he or she is sitting in.

In this way, the object tracking unit 220 may also determine whether the customer is out of the table. For example, when the real-time location of the customer is continuously out of the table and the space around the table for a predetermined time or more, the object tracking unit 220 may determine that the corresponding customer has left the table and that the table is no longer occupied by the customer. In this case, when a customer occupying a table returns to the table within a predetermined time, a table occupancy state of the customer may not be released, even though the corresponding table is unoccupied for a while.

Here, a reference time used for determining whether the table is occupied and a reference time used for determining whether the customer has left the table may be set by a system manager based on a behavior pattern of the customer and a statistical value.

The order information matching unit 230 may be configured to match a face image of a customer with order information of the customer. The customer recognition unit 210 may recognize a face of a customer by using the image of the customer, and may create new customer information (when there is no existing customer information) or import customer information (when there is registered customer information), and order information of the corresponding customer may be allocated to the corresponding customer information and managed by the order information matching unit 230. In addition, when the object tracking unit 220 identifies the table occupied by the customer, the order information matching unit 230 may match information of the corresponding table with the order information of the customer. For example, a table identification number and an in-store location of the table may be matched with the order information, and thus, the transfer robot 300 may use the location of the table when transferring food and beverage of the order.

The transfer robot control unit 240 may generate a command signal for controlling the transfer robot 300 and transmit the command signal to allow the transfer robot 300 to perform according to the command. The transfer robot control unit 240 may generate a command to allow the transfer robot 300 to move to a table determined by the object tracking unit 220 as being occupied by the customer and to receive an order of the customer located in the table. In addition, the transfer robot control unit 240 may generate a command signal to transfer the ordered food and beverage to the corresponding table. Because the transfer robot 300 receives from information on a table of the customer from the processing unit 200 and transfers the received information, the customer does not need to go to a pick-up stand of the store to get food and beverage, thereby improving the convenience of the customer. In addition, the number of employees serving in the store may be reduced, thereby saving the cost of operating the store.

The food/beverage consumption finish determination unit 250 may determine whether the consumption of food/beverage by a customer is finished based on an image obtained by the image obtaining unit 100. Here, the food/beverage consumption finish determination unit 250 may determine whether the consumption of the customer is finished by comprehensively considering at least one of a duration of a consumption activity of the customer, an amount of a remaining content of food and beverage ordered by the customer, a frequency of eating activity of the customer, an arrangement of tableware placed on the table in which the consumption activity takes place. Alternatively, when a collection request of the customer occurs, the food/beverage consumption finish determination unit 250 may determine that the consumption of the customer is finished.

In addition, the food/beverage consumption finish determination unit 250 may determine whether a tableware is arranged in a predetermined area of the corresponding table of the customer, and determine whether the consumption of the customer is finished based on the determination result. For example, the food/beverage consumption finish determination unit 250 may determine whether the consumption of the customer is finished by sensing whether a tableware is arranged in the predetermined area by using a sensor provided in the table or by analyzing an image of the table obtained by the image obtaining unit 100.

In addition, the food/beverage consumption finish determination unit 250 may determine whether a subject of consumption to be finished is available for a free refill or requires a pay order. Here, the subject of consumption to be finished may be an individual beverage or cooked food located on the table and consumed. For example, when the customer is eating the cooked food but has drank all water in the corresponding table, the subject of consumption to be finished may be the cooked food and water. In this case, the food/beverage consumption finish determination unit 250 may determine that the consumption of the cooked food is not finished, and may determine that the consumption of water is finished. Here, the food/beverage consumption finish determination unit 250 may objectify an image of food and beverage in an image of the customer and surroundings thereof continuously obtained by the image obtaining unit 100, and determine whether the subject of consumption is finished based on a preset pay/free food and beverage reference according to the objectified image of the food and beverage.

The transfer robot control unit 240 may generate a control command for the transfer robot 300 according to the determination result of the food/beverage consumption finish determination unit 250. The transfer robot control unit 240 may generate a control command to collect tableware of a table in which a consumption is determined by the food/beverage consumption finish determination unit 250 to be finished, or may generate a control command to allow the transfer robot 300 to move to the table in which the consumption is determined to be finished to take an additional order. In addition, the transfer robot control unit 240 may generate a control command to provide a free refill of the finished subject of consumption when the food/beverage consumption finish determination unit 250 determines that the finished subject of consumption is available for a free refill, and may generate a control command to allow the transfer robot 300 to move to the corresponding table to take an additional order of the customer when the finished subject of consumption requires a pay order. For example, in the above situation, when the subject for which consumption is to be finished is water, which is available for a free refill, it may be determined that consumption of water is finished, and immediately, the transfer robot control unit 240 may generate a control command to move the transfer robot 300 to transfer water to the corresponding table.

Because an employee does not directly identify a situation of the table and serve the table in the store, it may be difficult to respond to requests of the customer during a consuming and finishing process in the table. However, the situation may be identified through image analysis so that the transfer robot 300 may respond to the requests of the customer, thus reducing the inconvenience of the customer and spontaneously inducing an additional order of the customer.

The transfer robot 300 may receive a control command of the transfer robot control unit 240 of the processing unit 200 and perform the received control command.

Figure 2:
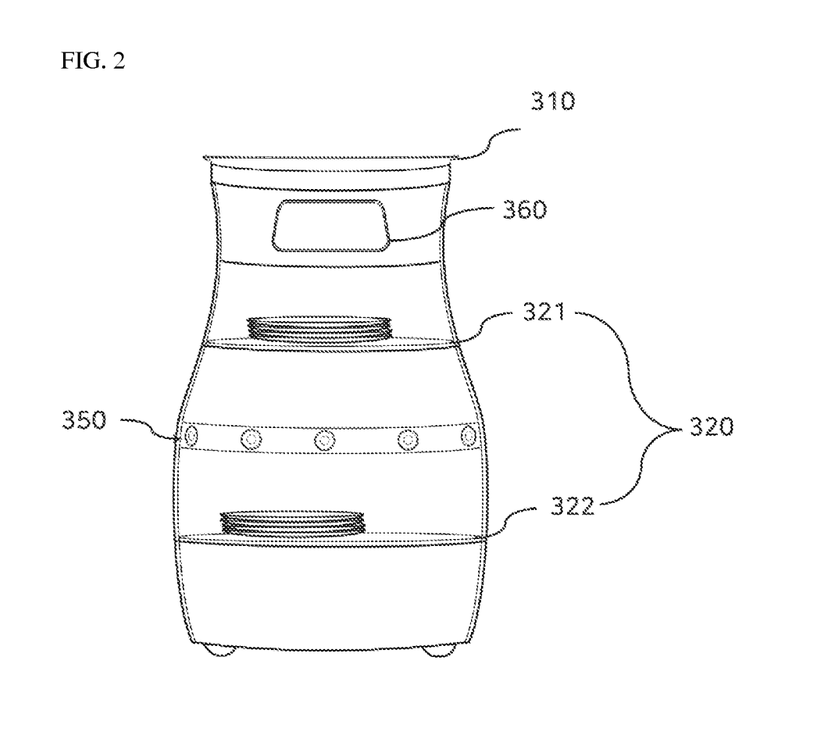
FIG. 2 is a schematic view of an exterior of a transfer robot according to an embodiment of the present disclosure.

FIG. 2 is a schematic view of an exterior of the transfer robot 300 according to an embodiment of the present disclosure.

Referring to FIGS. 1 and 2, the transfer robot 300 may include a transfer plate 310, a collection plate 320 including plates 321 and 322, a communicator 330, a control unit 340, a sensor unit 350, and a display 360.

Food and beverage ordered by a customer may be located on the transfer plate 310. In an embodiment, the transfer plate 310 may be located at an uppermost end portion of the transfer robot 300 so that the customer may readily take the ordered food and beverage. The collection plate 320 may be provided at a lower end portion of the transfer plate 310. The collection plate 320 is a plate for collecting tableware after another customer finishes eating or drinking and may make it inconvenient for other customers to eat or drink, such as like leftover food, and thus, may be provided at a middle of the transfer robot 300 and covered with another portion of the transfer robot 300 so as not to be visible to the outside. In addition, the transfer robot 300 may be provided with a shield (not shown) so that the collection plate 320 is not seen from the outside, and the shield may be manipulated to cover the collection plate 320.

The transfer robot 300 may receive a control command of the transfer robot control unit 240 through the communicator 330. The communicator 330 may be configured to receive necessary information or a control command signal from a server or an apparatus including the processing unit 200, or to transmit obtained information to the server or the apparatus including the processing unit 200. Here, the network may include a wired or wireless network. In addition, the network may include a network to which the server or the apparatus including the processing unit 200 and the transfer robot 300 are directly connected, or may be a private network generated by a repeater. The network may include a communication network that is a high-speed backbone network of a large-sized communication network capable of large-capacity, long-distance voice, and data service, and may be a next-generation wired/wireless network for providing an Internet or a high-speed multimedia service. When the network is a wireless communication network, the network may include cellular communication or near field communication. For example, the cellular communication may include at least one of long-term evolution (LTE), LTE advanced (LTE-A), $5^{th}$ generation (5G), code division multiple access (CDMA), wideband CDMA (WCDMA), universal mobile telecommunications system (UMTS), wireless broadband (WiBro), and global system for mobile communications (GSM). The near field communication may include at least one of wireless fidelity (Wi-Fi), Bluetooth, Zigbee, and near field communication (NFC). However, the communication method is not limited thereto and may include a technology of wireless communication that will be developed in the future.

The control unit 340 is configured to process a movement and motion control of the transfer robot 300 to perform a control command by the transfer robot control unit 240 received via the communicator 330, or is configured to execute a risk level determination according to a situation occurring while performing movement for transfer and collection, a motion control of the transfer robot 300 based on the risk level determination, and various processes related to an image processing and recognition operation. For example, the control unit 340 may include a central processing unit (CPU), an application processor (AP), and the like, and may include a memory therein to store commands or data related to at least one other element, or may access necessary information by communicating with an external memory when necessary.

The sensor unit 350 may be configured to collect information on surroundings of the transfer robot 300 so that the transfer robot 300 may perform a transfer and collection operation without any problem. At least one of an image sensor, a weight sensor, or a photo sensor may be included in the sensor unit 350. For example, the image sensor may include an electro absorption modulator (EAM) based three-dimensional time of flight (TOF) image sensor, but is not limited thereto. The image sensor may detect a peripheral portion of the transfer robot 300 to effectively avoid an obstacle when the transfer robot 300 moves. The weight sensor may be provided on the transfer plate 310 or the collection plate 320 to sense whether each plate is empty or food and beverage or tableware is loaded on each plate. The photo sensor is a sensor for avoiding an obstacle and may be a LiDAR sensor using a microelectromechanical systems (MEMS) scanner. Because a general LiDAR technique performs scanning using a large electric motor using direct current (DC) driving, volume, weight, and power consumption are large, and thus, the LiDAR technique is not suitable to be mounted on the transfer robot 300. On the other hand, the MEMS scanner is a miniature scanner and may significantly reduce volume, weight, and power consumption and thus may be suitable for the transfer robot 300. The obstacle avoidance of the transfer robot 300 may be suitable for an in-store environment having various collision variables because an avoidance algorithm is operated by fusing a three-dimensional image sensor and a sensing signal of the LiDAR.

The display 360 may be configured to show a menu of the store so that the customer may place an order, or may be configured to receive an order through a user input. To this end, the display 360 may include a display for receiving a touch input.

Figure 3:
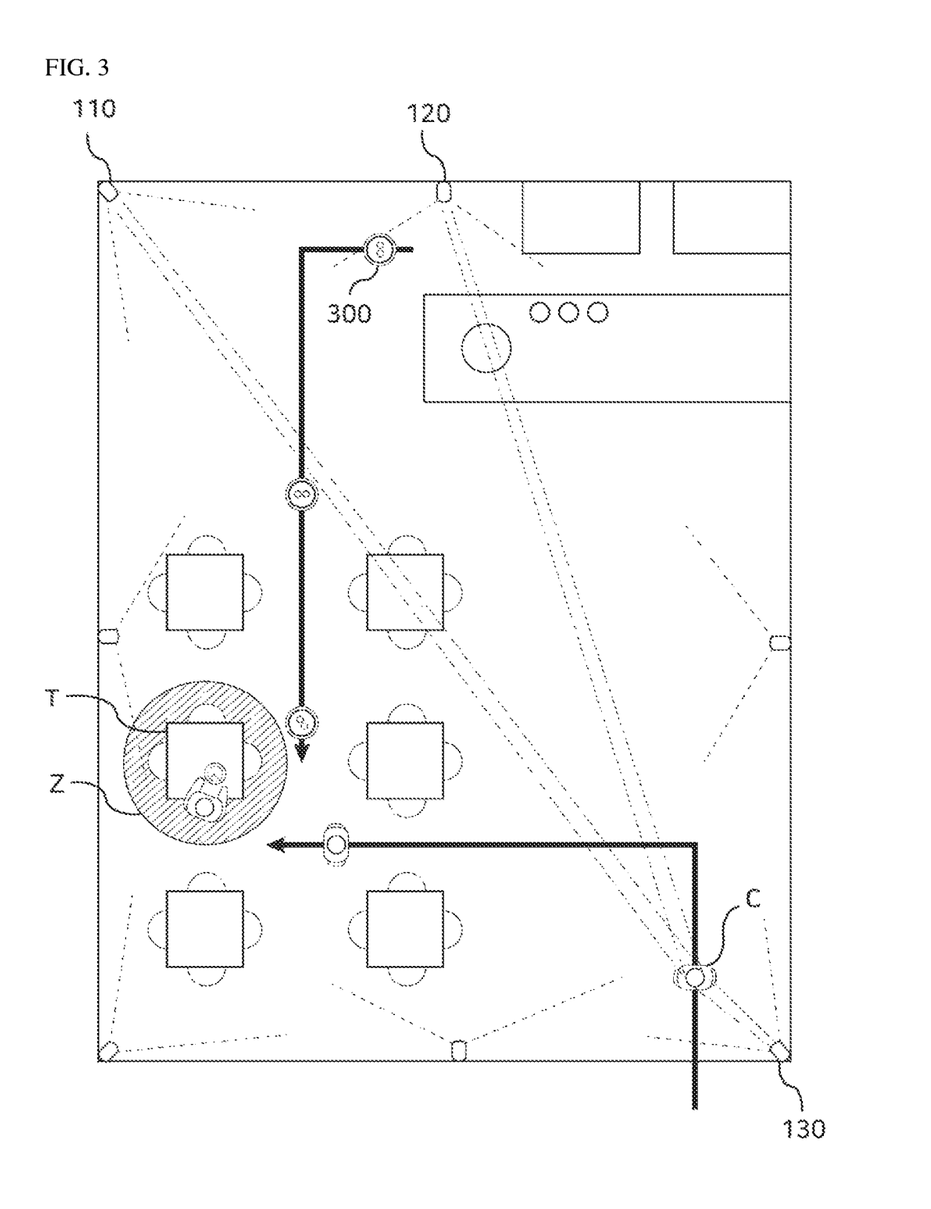
FIG. 3 is a schematic view of a state in which a customer enters a store, places an order, and eats and drinks food and beverage and a transfer robot transfers and collects the food and beverage, according to an embodiment of the present disclosure.

FIG. 3 is a schematic view of a state in which a customer enters a store, places an order, and eats food and a transfer robot transfers and collects food and beverage, according to an embodiment of the present disclosure.

Referring to FIG. 3, the image obtaining unit 100, that is, a plurality of cameras including the first camera 110, the second camera 120, and a third camera 130, may be installed in the store here and there. When a customer C enters a field of view of an image of the image obtaining unit 100, the customer C may be identified by analyzing a face image of the customer C in an image obtained by the customer recognition unit 210. When the customer C is identified, the object tracking unit 220 may continuously track the customer C. In addition, the object tracking unit 220 may identify a location of the customer C in the store using three-dimensional spatial information of the store that is previously constructed.

Here, each of a plurality of tables T provided in the store may have an independent recognition area Z. The recognition area Z may include a reference area for determining whether a table is occupied by a customer by using the object tracking unit 220. For example, the customer C may approach a table T in the store and occupy the table T. In this case, the object tracking unit 220 may measure a time taken for the customer C to enter the recognition area Z of the table T and to exit the table T. When the time exceeds a predetermined reference time, the object tracking unit 220 may determine that the table T is occupied by the customer C. The reference time may vary according to settings. When the object tracking unit 220 determines that the table T is occupied by the customer C, the transfer robot control unit 240 may generate a control command and transmit the control command to the transfer robot 300, and the transfer robot 300 may approach the table T to take an order of the customer C. The customer C may order food and beverage by using the display 360 of the transfer robot 300, and order information received by the transfer robot 300 using the display 360 may be transmitted to the processing unit 200 via the communicator 330 of the transfer robot 300. The order information matching unit 230 of the processing unit 200 may match the identified face image of the customer C with the received order information and manage the matched image and the information.

When a cooked or prepared food or beverage is placed on the transfer plate 310 of the transfer robot 300, the transfer robot control unit 240 may generate a control command to transfer a food or beverage ordered by the customer C to the table T occupied by the customer C and transmit the generated control command to the transfer robot 300. According to the transmitted control command, the transfer robot 300 may move to the table T, and the customer C may receive the food or beverage placed on the transfer plate 310.

While the customer C consumes the food or beverage, the image obtaining unit 100 may continuously obtain an image of the table T. A camera of the image obtaining unit 100 may be installed on the ceiling above the table T to continuously obtain an image of the recognition area Z of the table T. The food/beverage consumption finish determination unit 250 may determine whether the subject of consumption to be finished is finished based on the image of food or beverage Here, the image of food or beverage may include one of an amount of the remaining content of the food or beverage, a frequency of eating or drinking activities of the customer C, and an arrangement of tableware on the table T. The food/beverage consumption finish determination unit 250 may also determine that the consumption of the customer C is finished from a meal time of the customer C or a collection request of the customer. When the food/beverage consumption finish determination unit 250 determines that the consumption of the customer C is finished, the transfer robot control unit 240 may generate a control command to allow the transfer robot 300 to move to the table T and collect the tableware, and the transfer robot 300 may move to the corresponding to the table T to collect the tableware according to the received control command.

In addition, the food/beverage consumption finish determination unit 250 may determine whether the subject of consumption to be finished in the table T is available for a free refill or requires a pay order by continuously analyzing the image of the table T obtained by the image obtaining unit 100. Here, the subject of consumption to be finished may include each of food or beverage transferred to the table T, and may include, for example, a beverage, a cooked food, water, or the like. When the food/beverage consumption finish determination unit 250 determines that one of the subjects of consumption to be finished by the customer is finished, the food/beverage consumption finish determination unit 250 may determine whether the finished subject of consumption is available for a free refill or requires a pay order, and then, the transfer robot control unit may generate a control command to control the transfer robot 300.

The transfer robot control unit 240 may generate a control command to allow the transfer robot 300 to transfer the finished subject of consumption and transmits the control command to the transfer robot 300 when the finished subject of consumption is available for a free refill, and may generate a control command to allow the transfer robot 300 to move to the table T to take an additional order when the finished subject of consumption requires a pay order.

Figure 4A:
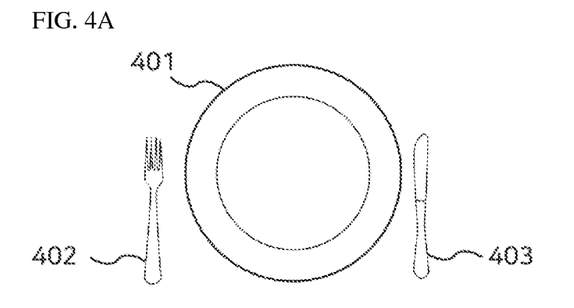
FIGS. 4A, 4B, and 4C are views of types of arrangement of tableware determined by a food/beverage consumption finish determination unit, according to an embodiment of the present disclosure.
Figure 4B:
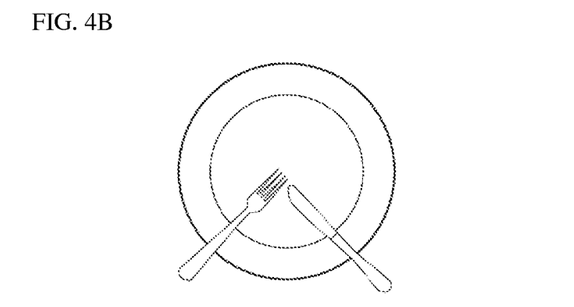
Figure 4C:
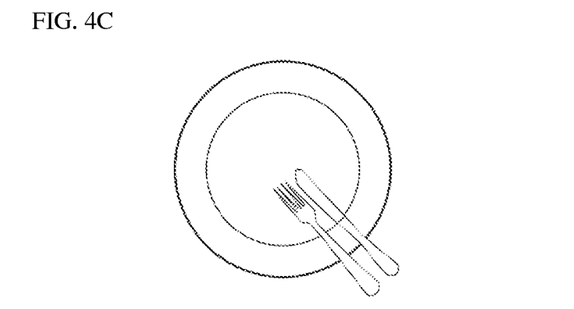

FIG. 4 is a view of types of arrangement of tableware determined by the food/beverage consumption finish determination unit 250, according to an embodiment of the present disclosure. In an embodiment, FIG. 4A illustrates a state in which a fork 402 and a knife 403 are arranged in parallel with each other at opposite sides of a plate 401 independently of each other. The food/beverage consumption finish determination unit 250 may determine that a consumption is started by recognizing the arrangement of tableware. FIG. 4B illustrates a state in which the fork 402 and the knife 403 are placed on the plate 401 in different directions. The food/beverage consumption finish determination unit 250 may determine that the consumption is in progress from the arrangement of tableware. FIG. 4C illustrates a state in which the fork 402 and the knife 403 are diagonally placed on the plate 401 in the same direction. The food/beverage consumption finish determination unit 250 may determine that the consumption is finished from the arrangement of tableware. When the food/beverage consumption finish determination unit 250 may recognize the arrangement of tableware in FIG. 4C and determines that the consumption in the table T is finished, the transfer robot control unit 240 may generate a control command to allow the transfer robot 300 to move to the table T, and the transfer robot 300 may move to the table T to provide a free refill, take an additional order, or collect the tableware.

Figure 5:
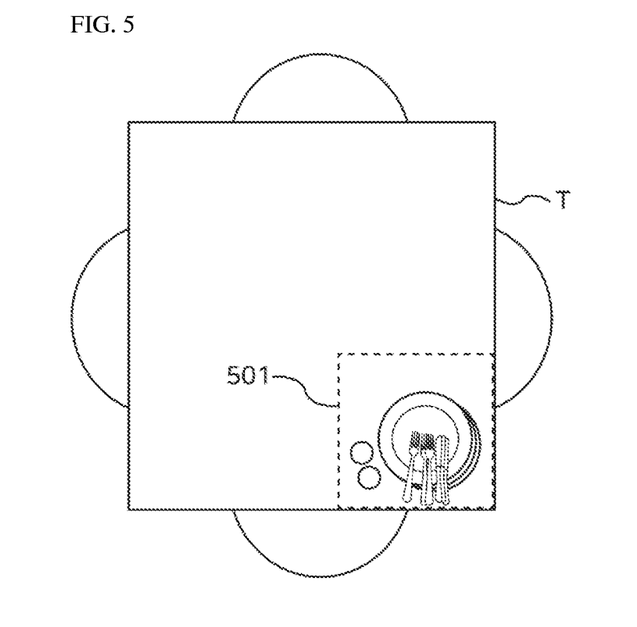
FIG. 5 is a view of a tableware collection area of a table according to an embodiment of the present disclosure.

FIG. 5 is a view of a tableware collection area of a table according to an embodiment of the present disclosure.

Referring to FIG. 5, in an embodiment, a tableware collection area 501 may be predetermined in the table T. Here, the tableware collection area 501 may include a virtual area recognized by the food/beverage consumption finish determination unit 250 in an image of the table T obtained by the image obtaining unit 100. When the customer C completes consumption of food or beverage, the customer C may move the tableware to the tableware collection area 501. The food/beverage consumption finish determination unit 250 may analyze an arrangement of the tableware in the tableware collection area 501 in the image, and when it is determined that the tableware is arranged in the tableware collection area 501, determine that the consumption in the corresponding table is finished. In addition, the food/beverage consumption finish determination unit 250 may determine whether the tableware is arranged in the tableware collection area by using a sensor (not shown) provided in the table T. For example, a sensor may be installed in the tableware collection area 501 of the table T, and the food/beverage consumption finish determination unit 250 may determine whether the tableware is arranged in the tableware collection area 501 based on the sensing of the sensor in the tableware collection area 501. When the food/beverage consumption finish determination unit 250 determines that the consumption in the table T is finished, the transfer robot control unit 240 may generate a control command to allow the transfer robot 300 to move to the table T, and the transfer robot 300 may move to the table T to provide a free refill, take an additional order, or collect the tableware.

A method of transferring and collecting food and beverage in a store according to an embodiment of the present disclosure will be described below. The method of transferring and collecting food and beverage in a store may be performed by the in-store food and beverage transfer and collection system described above. Specific meanings of terms and words may be the same as those of the in-store food and beverage transfer and collection system, and redundant description will be omitted.

Figure 6:
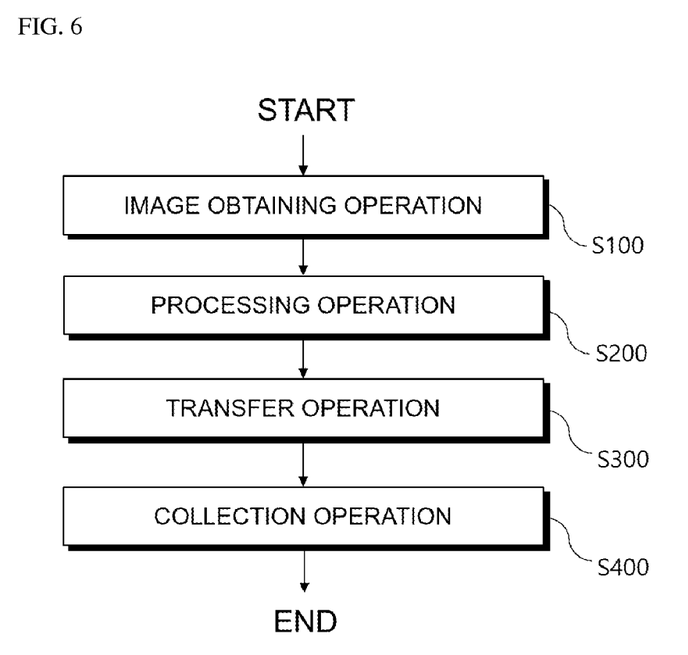
FIG. 6 is a flowchart of a method of transferring and collecting food and beverage in a store according to an embodiment of the present disclosure.

FIG. 6 is a flowchart of a method of transferring and collecting food and beverage in a store according to an embodiment of the present disclosure.

Referring to FIG. 6, in an embodiment, the method of transferring and collecting food and beverage in a store may include an image obtaining operation S100, a processing operation S200, a transfer operation S300, and a collection operation S400.

The image obtaining operation S100 may include an operation of obtaining an image of a predetermined area by an image obtaining unit including a plurality of cameras. The processing operation S200 may include an operation of processing, by a processing unit, a control command for processing an order of a customer using the image obtained by the image obtaining unit. The transfer operation S300 may include an operation of, obtaining order information of the customer according to a control command of the processing unit and transferring the ordered food and beverage, by using a transfer robot. The collection operation S400 may include an operation of moving, by the transfer robot, to a table in which a consumption is finished to collect tableware according to the control command.

Figure 7:
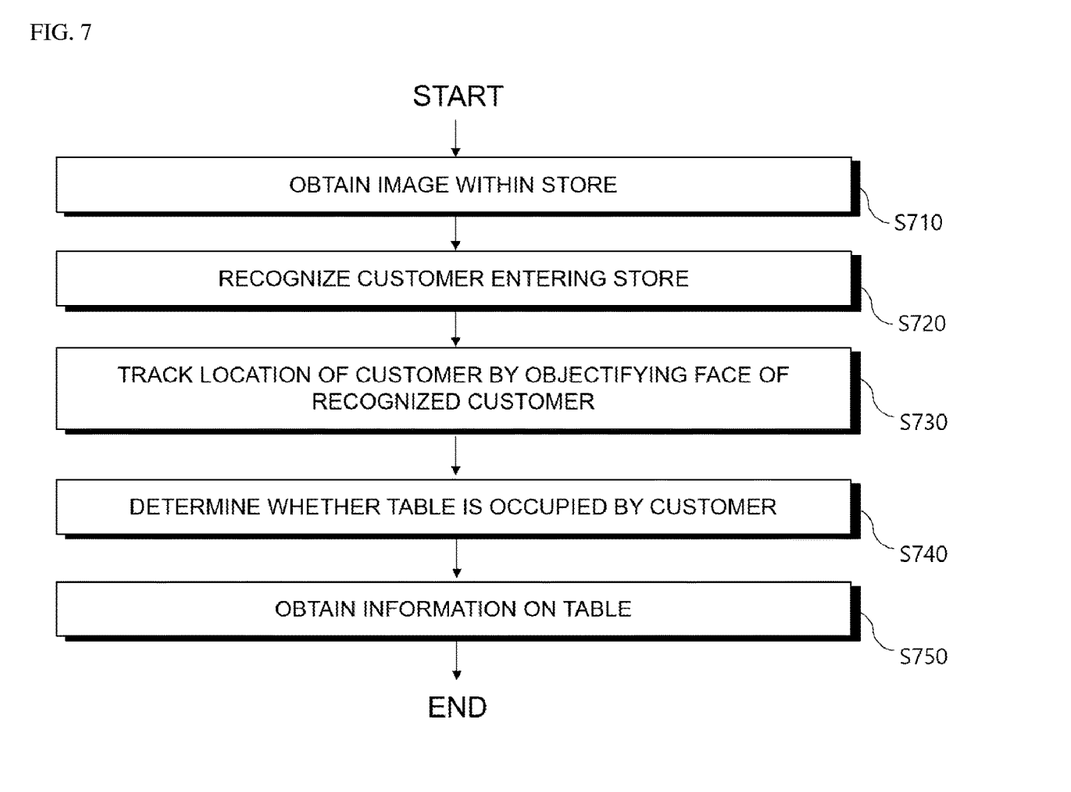
FIG. 7 is a flowchart of a method of identifying and tracking a customer in a store using image analysis, according to an embodiment of the present disclosure.

FIG. 7 is a flowchart of a method of identifying and tracking a customer in a store by using image analysis, according to an embodiment of the present disclosure.

Referring to FIG. 7, according to an embodiment, the method of transferring and collecting food and beverage in a store may include obtaining an image of a complete view or a specific area within the store by using an image obtaining unit including a plurality of cameras, in operation S710. When a customer enters the store of which an image is obtained by the image obtaining unit, a customer recognition unit may identify or recognize the customer by analyzing a face image of the customer, in operation S720. When the customer recognition unit identifies the customer, an object tracking unit may track the identified customer in the image obtained by the image obtaining unit, in operation S730. A real-time location of the customer is tracked by objectifying the face of the customer and analyzing the image of the store, and during this process, 3D spatial information of the store that is previously constructed may be used. When the customer approaches a table while moving within the store, the object tracking unit may determine the table is occupied by the customer. The determination of whether the table is occupied by the customer described above may include determining, by the object tracking unit, that the customer occupies the table when a time for which the customer stays in a recognition area of the table is greater than or equal to a predetermined reference time. For example, when it is assumed that the predetermined reference time is one minute, the object tracking unit may determine that the customer has not occupied the table when the customer stays in the table for less than one minute and deviates from the recognition area of the table. When the customer stays in the table for one minute or longer, the object tracking unit may determine that the corresponding table is occupied by the customer, in operation S740. When the object tracking unit determines that the table is occupied by the customer, information on the corresponding table may be obtained by the processing unit. The obtained table information may include a location or an identification code of the table, and the transfer robot may move to the corresponding table based on the obtained table information to receive an order or transfer or collect food or beverage, in operation S750.

Figure 8:
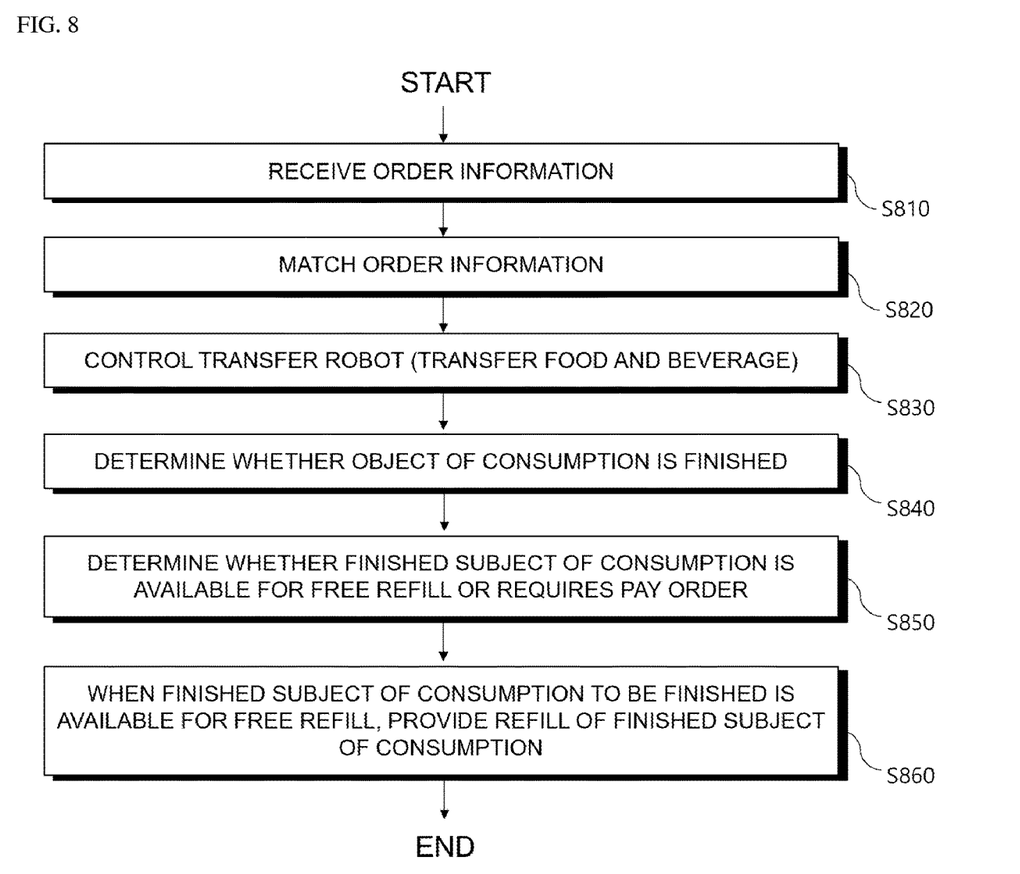
FIG. 8 is a flowchart of a method of serving ordered food and beverage to a table using a transfer robot, according to an embodiment of the present disclosure.

FIG. 8 is a flowchart of a method of serving ordered food and beverage to a table by using a transfer robot, according to an embodiment of the present disclosure.

Referring to FIG. 8, the in-store food and beverage transfer and collection system may receive order information of food or beverage from a customer, in operation S810. Here, the customer may place an order using an apparatus for receiving an order provided in a table. Here, the apparatus may include, for example, a tablet personal computer (PC) that is connected to the in-store food and beverage transfer and collection system through a network. In addition, a quick response (QR) code connected to an Internet website for placing an order may be provided on the table, and thus, a food or beverage may be ordered on the corresponding website by recognizing the QR code using a smartphone or a tablet PC possessed by the customer. When the QR code is recognized, location information and identification information of the corresponding table may be automatically recognized, and when the customer orders a food or beverage, the information may be automatically transmitted to the food and beverage transfer and collection system. In addition, by analyzing the image obtained by the image obtaining unit provided in the store through the embodiment shown in FIG. 7, the customer may be tracked, and the table occupied by the customer may be directly determined by a processing unit of the food and beverage transfer and collection system. In this case, the transfer robot may move to the table determined to be occupied by the customer to receive an order of the customer.

When order information is received from the customer, an order information matching unit may match the order information of the customer with information on the table occupied by the customer or a face image of the customer, in operation S820. When the table information and the order information are matched with each other and making and cooking of the ordered food or beverage is completed, a transfer robot control unit may generate a control command to transfer the food or beverage ordered by the customer to the table occupied by the customer, in operation S830. The transfer robot may transfer the food or beverage to the corresponding table according to the received control command. When the customer consumes the transferred food or beverage, a food/beverage consumption finish determination unit may determine whether a subject of consumption is finished by using the image of the corresponding table obtained by the image obtaining unit or according to whether tableware is arranged in a predetermined area of the table, in operation S840. Here, a method of determining whether the subject of consumption is finished, by using the food/beverage consumption finish determination unit is the same as the embodiment of determining whether the consumption is finished by using the food/beverage consumption finish determination system of the in-store food and beverage transfer and collection system described above.

When the food/beverage consumption finish determination unit determines that one of the subjects of consumption is finished, it may be determined whether the corresponding finished subject of consumption is available for a free refill or requires a pay order, in operation S850. When the finished subject of consumption is available for a free refill, the transfer robot control unit may generate a control command to immediately transfer a refill of the finished subject of consumption, and the transfer robot may transfer the refill to the corresponding table according to the received control command, in operation S860.

Various embodiments described herein may be implemented by hardware, middleware, microcode, software, or any combinations thereof. For example, various embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or any combinations thereof.

Also, for example, various embodiments may be recorded on or encoded in a computer-readable medium including instructions. The computer-readable medium or encoded instructions may cause a programmable processor or other processor to perform a method, for example, when the instructions are executed. The computer-readable medium includes both a computer storage medium and a communication medium including any medium that facilitates transfer of a computer program from one place to another. The storage medium may be any available medium that can be accessed by a computer. For example, such computer-readable medium may include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store desired program code in the form of instructions or data structures accessible by a computer.

Such hardware, software, firmware, etc. may be implemented in the same device or in separate devices to support various operations and functions described herein. In addition, in the present disclosure, the elements, units, modules, and components described as " . . . unit" may be implemented together in conjunction with each other, or may be individually implemented as logic devices that are separate but interoperable. The description of different features for modules, units, etc. is intended to emphasize different functional embodiments and does not necessarily mean that they should be realized by individual hardware or software components. Rather, the functionality associated with one or more modules or units may be performed by individual hardware or software components or incorporated into common or individual hardware or software components.

In the in-store food and beverage transfer and collection system and method according to an embodiment of the present disclosure, it is possible to respond to a customer by obtaining an image of a complete view within a store and automatically determining a situation within the store.

In addition, an inconvenience that the customer directly moves to an order stand of the store to place an order and picks up food and beverage may be removed, thus improving the customer convenience.

In addition, the present disclosure is to automatically provide a free refill or take an additional order of food and beverage by automatically recognizing that the customer has finished eating and drinking.

In addition, the present disclosure is to automatically collect dishes of a customer when the customer finishes eating and drinking.

Although operations are shown in the drawings in a specific order, it should not be construed that these operations are performed in the specific order shown, or in sequential order shown to achieve a desired result, or that all of the shown operations need to be performed. Under an arbitrary environment, multitasking and parallel processing may be advantageous. Furthermore, it should be construed that the division of various components in the above-described embodiments is not required in all embodiments, and the described components may be generally integrated together as a single software product or packaged as a plurality of software products.

Although the present disclosure is described with reference to the embodiments illustrated in the drawings, it will be understood by those of skill in the art that various modifications and other equivalent embodiments are possible. Therefore, the true technical scope of protection of the present disclosure should be determined according to the technical spirit of the following claims.

What is claimed is:

1. An in-store food and beverage transfer and collection system using image analysis, the in-store food and beverage transfer and collection system comprising:
    an image obtaining unit comprising a plurality of RGB-depth cameras configured to obtain images of a predetermined area and construct three-dimensional (3D) spatial information of a structure of a store and tables based on the images;

a processing unit configured to process a control command for processing an order of a customer by using the image obtained by the image obtaining unit;

a customer recognition unit configured to analyze a face image of the customer obtained by the image obtaining unit and identify the customer based on the face image; and a transfer robot configured to obtain order information of the customer according to the control command of the processing unit, and transfer food and beverage that are ordered, wherein the processing unit comprises:

an object tracking unit configured to:

obtain information of a table occupied by the customer, the information of the table including a location or an identification code of the table;

track a real-time location of the customer identified by the customer recognition unit based on the 3D spatial information of the structure of the store and tables by using a shape of clothes of the customer, a color of clothes of the customer, a hair style of the customer, or a skin color of the customer in the image obtained by the image obtaining unit;

determine whether the customer moves toward the table or moves away from the table based on the 3D spatial information of the structure of the store and tables and the real-time location of the customer;

determine whether the customer is continuously out of a predetermined space around the table for a predetermined time; and release an occupancy state of the table by the customer in response to determining that the customer is continuously out of the predetermined space around the table for the predetermined time; and an order information matching unit configured to match the order information with the information of the table occupied by the customer and the face image of the customer.

2. The in-store food and beverage transfer and collection system of claim 1, wherein the object tracking unit is further configured to obtain information on the table occupied by the customer by using the image obtained by the image obtaining unit.

3. The in-store food and beverage transfer and collection system of claim 2, wherein the object tracking unit is further configured to determine that the table is occupied by the customer when a time for which the customer stays in the table is greater than or equal to a predetermined reference time, and the predetermined reference time is set based on a behavior pattern of the customer.

4. The in-store food and beverage transfer and collection system of claim 1, wherein the processing unit further comprises a transfer robot control unit configured to generate a control command to allow the transfer robot to obtain the order information of the customer in a table determined to be occupied by the customer.

5. The in-store food and beverage transfer and collection system of claim 1, wherein the processing unit further comprises a transfer robot control unit configured to generate a control command to allow the transfer robot to transfer the food or beverage ordered by the customer to a table determined to be occupied by the customer.

6. The in-store food and beverage transfer and collection system of claim 1, wherein the processing unit further comprises:

a food/beverage consumption finish determination unit configured to determine a food/beverage consumption finish of the customer based on an image of food or beverage obtained by the image obtaining unit; and a transfer robot control unit configured to generate a control command to allow the transfer robot to collect tableware from a table that the food/beverage consumption finish determination unit determines that a consumption is finished.

7. The in-store food and beverage transfer and collection system of claim 6, wherein the food/beverage consumption finish determination unit is further configured to determine a food/beverage consumption finish of the customer based on at least one of a meal time, an amount of leftover food, a frequency of consuming activity, an arrangement of tableware, and a collection request of the customer.

8. The in-store food and beverage transfer and collection system of claim 6, wherein the food/beverage consumption finish determination unit is further configured to determine whether tableware is arranged in a predetermined area of the table in which the consumption is determined to be finished, and the transfer robot control unit is further configured to generate a control command to allow the transfer robot to collect the tableware arranged in the predetermined area.

9. The in-store food and beverage transfer and collection system of claim 6, wherein the transfer robot control unit is further configured to generate a control command to allow the transfer robot to move to the table in which the consumption is determined to be finished, and receive an additional order.

10. The in-store food and beverage transfer and collection system of claim 1, wherein the processing unit further comprises:

a food/beverage consumption finish determination unit configured to determine whether a finished subject of consumption is available for a free refill; and a transfer robot control unit configured to, when the food/beverage consumption finish determination unit determines that the finished subject of consumption is available for the free refill, generate a control command to allow the transfer robot to transfer to refill the finished subject of consumption.

11. The in-store food and beverage transfer and collection system of claim 1, wherein the processing unit further comprises:

a food/beverage consumption finish determination unit configured to determine whether a finished subject of consumption requires a pay order; and a transfer robot control unit configured to, when the food/beverage consumption finish determination unit determines that the finished subject of consumption requires the pay order, generate a control command to allow the transfer robot to move to a table in which the consumption is determined to be finished, to receive an additional order.

12. A method of transferring and collecting food and beverage in a store using image analysis, the method comprising:

an image obtaining operation of obtaining images of a predetermined area by using an image obtaining unit and constructing three-dimensional (3D) spatial information of a structure of a store and tables based on the images, the image obtaining unit comprising a plurality of RGB-depth cameras;

a processing operation of processing, by a processing unit, a control command for processing an order of a customer by using the image obtained by the image obtaining unit;

an analyzing operation of analyzing a face image of the customer obtained by the image obtaining unit and identifying the customer based on the face image; and a transfer operation of obtaining order information of the customer according to the control command of the processing unit and transferring food and beverage that are ordered, by using a transfer robot, wherein the processing operation comprises:

an obtaining operation of obtaining, by an object tracking unit, information of a table occupied by the customer, the information of the table including a location or an identification code of the table;

a tracking operation of tracking a real-time location of the identified customer based on the 3D spatial information of the structure of the store and tables by using a shape of clothes of the customer, a color of clothes of the customer, a hair style of the customer, or a skin color of the customer in the image obtained by the image obtaining unit;

determining whether the customer moves toward the table or moves away from the table based on the 3D spatial information of the structure of the store and tables and the real-time location of the customer;

a determining operation of determining whether the customer is continuously out of a predetermined space around the table for a predetermined time;

a releasing operation of releasing an occupancy state of the table by the customer in response to determining that the customer is continuously out of the predetermined space around the table for the predetermined time; and a matching operation, by an order information matching unit, of matching the order information with the information of the table occupied by the customer and the face image of the customer.

13. The method of claim 12, wherein the information on the table occupied by the customer is obtained by using the image obtained by the image obtaining unit.

14. The method of claim 13, wherein the object tracking operation comprises, when a time for which the customer stays in the table is greater than or equal to a predetermined reference time, determining that the table is occupied by the table by using the object tracking unit, and the predetermined reference time is set based on a behavior pattern of the customer.

15. The method of claim 13, wherein the processing operation further comprises a transfer robot control operation of generating, by the processing unit, a control command to allow the transfer robot to obtain the order information of the customer in a table determined to be occupied by the customer.

16. The method of claim 13, wherein the processing operation further comprises a transfer robot control operation of generating, by the processing unit, a control command to allow the transfer robot to transfer a food or beverage ordered by the customer to a table determined to be occupied by the customer.

* * * * *